Oct. 29, 1940.   W. L. WOODWARD ET AL   2,220,008
RADIO DIRECTION FINDER
Filed Sept. 8, 1939

Inventors.
William L. Woodward
Marcus G. Limb
by Heard Smith & Tennant.
Attys.

Patented Oct. 29, 1940

2,220,008

UNITED STATES PATENT OFFICE 2,220,008

RADIO DIRECTION FINDER

William L. Woodward, South Yarmouth, and Marcus G. Limb, West Yarmouth, Mass., assignors, by mesne assignments, to Cape Cod Instrument Company, Hyannis, Mass., a corporation of Massachusetts Application September 8, 1939, Serial No. 293,970

3 Claims. (Cl. 250—11)

This invention relates to a radio direction finder of that known type which comprises a directional loop antenna adapted to be manually rotated about a vertical axis, a radio receiver to receive the signal picked up by the antenna and give an audible indication thereof, and a compass element associated with the loop antenna and by which the direction of the latter and consequently the direction of the radio beam can be determined when the antenna is set for minimum signal reception.

One object of the invention is to provide means which facilitates the reading of the compass when the loop is thus adjusted for minimum reception. A further object of the invention is to provide a novel device which is constructed so that the person who is manually adjusting the loop antenna can easily read the compass when the antenna has been brought into the position of minimum signal reception.

One way of accomplishing this object is by mounting the compass element direction on the loop antenna so that the compass bowl with its lubber line will rotate with the antenna when the latter is adjusted. The position of the compass bowl about its vertical axis is thus fixed with respect to the antenna and the compass card will thus indicate at all times the direction of the antenna and consequently the direction of the radio beam.

Another way of attaining the object of the invention is by mounting the compass bowl independently of the antenna, but so connecting the bowl to the antenna that the compass bowl will always rotate in synchronism with the antenna when the latter is adjusted.

In order to give an understanding of the invention we have illustrated herein some embodiments thereof, which will now be described after which the novel features will be pointed out in the appended claims.

In the drawing—

Figure 1:
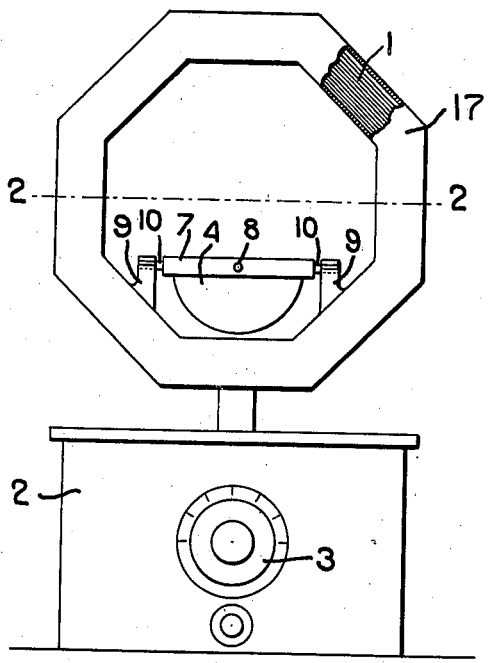
Fig. 1 is a view of an apparatus embodying our invention.

In the drawing 1 indicates a directional loop antenna and 2 indicates a radio receiving apparatus connected to the antenna and by which signals picked up by the antenna may be audibly delivered, said radio receiver having the usual tuning dial 3 by which it may be tuned to the frequencies of any radio signal. The loop antenna 1 is shown as being located within a housing member 17.

The loop antenna 1 and its housing 17 are mounted on the receiving apparatus so that the antennae can be turned about a vertical axis, and in using the device the receiver is first tuned to the frequency of the radio signal, the direction of which it is desired to determine, and then the loop antenna 1 is rotated manually into a position of minimum signal reception, that is, into a position in which the sound of the signal as delivered by the radio receiver is of minimum audibility. The position of the loop antenna at this time indicates the direction from which the radio signal is coming, it being understood that when the loop antenna is in the position of minimum signal reception, it stands at right angles to the direction of the radio beam.

In order to facilitate the quick and accurate determination of the direction of the loop when it is in a position of minimum signal reception we employ a compass element, which may be a magnetic compass having a movable card, or a so-called "repeater mechanism," and so mount the compass element that the compass bowl with its lubber line will be rotated about a vertical axis in synchronism with the rotation of the loop antenna.

Figure 2:
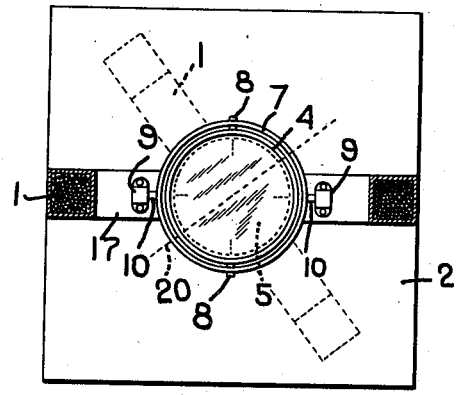
Fig. 2 is a section on the line 2—2 of Fig. 1.

In the preferred embodiment of our invention, the compass element is carried by the housing for the loop antenna and this is the construction illustrated in Figs. 1 and 2.

In said figures, 4 indicates a compass bowl within which is located a movable compass card 5, the latter carrying the magnetic elements which cause the compass card to indicate at all times the magnetic north-south direction. The compass bowl carries some suitable lubber line indication 6 by which the compass card is read.

In the construction shown in Fig. 1, the compass bowl 4 is not only mounted on the housing 17 for the loop antenna 1 but is located within said loop.

If the apparatus is to be used on a mobile element such as a vessel, we propose to mount the compass bowl in gimbals, so that it will always maintain a horizontal position regardless of any rolling or pitching of the vessel.

As shown in the drawing, the compass bowl 4 is pivotally mounted within the gimbal ring 7 by means of trunnions 8, and the gimbal ring 7 has trunnions 10 which are supported in bearings 9 that are mounted on opposite sides of the antenna housing 17, the trunnions 10 being at right angles to the trunnions 8, as usual in compass mountings.

In order that the compass element may not have any disturbing influence upon the signal or the operation of the loop antenna, we propose to make the compass bowl and the gimbal ring 7 and the other parts of the compass mounting of some non-metallic and non-conducting material, such, for instance, as Bakelite or its equivalent.

In using the device shown in Figs. 1 and 2, the loop antenna will be adjusted into a position in which the signal given by the radio receiver has minimum audibility, which, it will be assumed, is the dotted line position in Fig. 2. Since the compass element is mounted on the loop antenna, the compass bowl 4 with its lubber line 6 will turn with the antenna, the compass card 4, of course, always remaining in its magnetic north-south position. When the loop antenna is in its position of minimum reception the operator will then observe the position of the lubber line 6 with respect to the compass card 5 and the reading on the compass card given by the lubber line will indicate the direction of the incoming radio signal or beam, which is indicated by the dotted line 20, Fig. 2.

Figure 4:
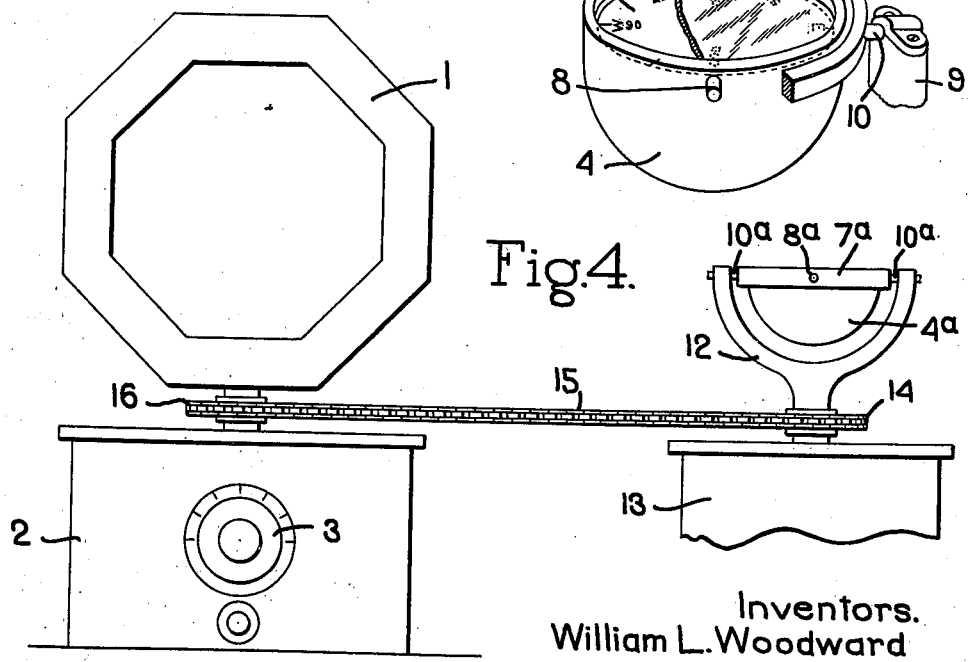
Fig. 4 is a view similar to Fig. 1 but showing a different embodiment of the invention.

In Fig. 4 we have shown an embodiment of the invention wherein the compass is mounted outside of the loop antenna but is connected thereto so as to rotate in synchronism therewith.

In this embodiment of the invention the compass bowl is shown at 4a and it is pivotally mounted by means of trunnions 8a in a gimbal ring 7a, the latter being pivotally mounted by trunnions 10a in a supporting member 12. This member 12 is mounted for vertical rotation on a suitable support 13 which is separate from the antenna 1 and radio receiver 2. The support 12 is shown as having a sprocket wheel 14 fast thereon, which is connected by a sprocket chain 15 with a sprocket wheel 16 connected with the loop antenna 1. This sprocket chain drive is so constructed that any rotating movement of the loop antenna produces a similar rotating movement of the support 12 and therefore of the compass bowl 4a. The position of the compass bowl 4a about its vertical axis is, therefore, always in fixed relation to the position of the loop antenna about its vertical axis.

Figure 3:
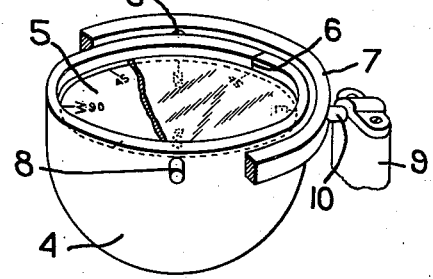
Fig. 3 is a perspective view of the compass shown in Figs. 1 and 2.

The operation of the device shown in Fig. 4 is similar to that shown in Figs. 1 to 3. When the loop antenna has been adjusted into position of minimum signal reception then the operator reads the position of the lubber line 6 with respect to the compass card 5 and this reading gives the direction of the incoming radio signal beam.

Both embodiments of the invention comprise a compass bowl having a lubber line and a movable card operative to indicate the magnetic north-south direction, and a mechanical connection between the loop antenna and the compass bowl by which the latter is rotated synchronously with the loop antenna when the latter is turned. In the device shown in Figs. 1 and 2, the mechanical connection between the loop antenna and the compass bowl comprises the bearings 9 in which the compass bowl is mounted. In the embodiment shown in Fig. 4, such mechanical connection comprises the sprocket chain 15 with the sprocket wheels 14 and 16.

While we have illustrated some embodiments of the invention, we do not wish to be limited to the construction shown.

We claim:

1. A radio direction finder comprising a rotatable directional loop antenna, a housing for said antenna, a radio receiver for receiving signals picked up by said antenna, said housing having two bearing members within the confines of the loop antenna, a gimbal ring pivotally mounted in said bearings, a compass bowl pivotally mounted on the gimbal ring, and a movable compass card within the bowl operative to indicate the magnetic north-south direction.

2. A radio direction finder comprising a directional loop antenna, a housing enclosing said antenna, bearing members rigid with the housing, a gimbal ring pivotally mounted in said bearing members, a compass bowl pivotally mounted in the gimbal ring and having a lubber line indication, and a magnetic compass card enclosed within said compass bowl and operative to indicate the magnetic north-south direction, said compass bowl rotating with the loop as the latter is turned about its axis.

3. A radio direction finder comprising a rotatable directional loop antenna, a housing for said antenna, a radio receiver for receiving signals picked up by said antenna, said housing having on each side thereof a bearing member located within the confines of the loop antenna, a gimbal ring of non-magnetic, non-conducting material located between said bearing members and pivotally mounted therein, a compass bowl also of non-magnetic, non-conducting material pivotally mounted in the gimbal ring, and a movable compass card within the bowl operative to indicate the magnetic north-south direction.

WILLIAM L. WOODWARD.
MARCUS G. LIMB.